(12) United States Patent
Tamura

(10) Patent No.: US 7,204,596 B2
(45) Date of Patent: Apr. 17, 2007

(54) PROJECTOR WITH TILT ANGLE MEASURING DEVICE

(75) Inventor: Youichi Tamura, Tokyo (JP)

(73) Assignee: NEC Corporation (JP)

( * ) Notice: Subject to any disclaimer, the term of this patent is extended or adjusted under 35 U.S.C. 154(b) by 250 days.

(21) Appl. No.: 10/922,865

(22) Filed: Aug. 23, 2004

(65) Prior Publication Data
US 2005/0062939 A1 Mar. 24, 2005

(30) Foreign Application Priority Data
Sep. 19, 2003 (JP) ............................. 2003-328108

(51) Int. Cl.
G03B 21/14 (2006.01)
H04N 3/23 (2006.01)
H04N 3/223 (2006.01)
H04N 3/227 (2006.01)
H04N 3/26 (2006.01)
G09G 5/00 (2006.01)

(52) U.S. Cl. .................... 353/70; 353/69; 348/746; 348/747; 348/806; 345/647

(58) Field of Classification Search .............. 353/69, 353/70, 101; 348/739, 744–747, 806; 349/7, 349/8; 345/647
See application file for complete search history.

(56) References Cited

FOREIGN PATENT DOCUMENTS

| JP | 05-048994 | 2/1993 |
| JP | HEI 09-197249 | 7/1997 |
| JP | HEI 09-281597 | 10/1997 |
| JP | 2001-169211 | 6/2001 |
| JP | 2003-005278 | 1/2003 |
| JP | 2003-018503 | 1/2003 |
| JP | 2003-029201 | 1/2003 |

Primary Examiner—W. B. Perkey
Assistant Examiner—Rochelle Blackman
(74) Attorney, Agent, or Firm—Dickstein, Shapiro, LLP.

(57) ABSTRACT

A projector having a tilt angle measurement device is provided with: a projection device for projecting an image onto a projection surface; a tilt angle measurement device for calculating the tilt angle that is formed between the axis of projection of the projection device and the projection surface; and an image control unit for controlling the output image from the projection device in accordance with the tilt angle that is calculated and thus correcting distortion in the image that is projected onto the projection surface. The tilt angle measurement device includes: a light guide unit that is provided on the projection-side surface of the case of the projector and separated from the axis of projection in a prescribed direction; a photodetection element for photodetecting, by way of the light guide unit, reflected light from at least two points that are projected onto the projection surface; and a tilt angle calculation unit for calculating the tilt angle that is formed between the axis of projection of the projection device and the projection surface based on photodetection position information of the reflected light of the photodetection element.

19 Claims, 10 Drawing Sheets

PROJECTOR WITH TILT ANGLE MEASURING DEVICE

BACKGROUND OF THE INVENTION

1. Field of the Invention

The present invention relates to a projector, and more particularly, to a projector having a tilt angle measuring device for calculating the tilt angle of the optical axis of projection of the projection device of the projector and the projection surface.

2. Description of the Related Art

The rapid progress of liquid crystal technology and DLP (registered trademark) (Digital Light Processing) technology has been accompanied by advances in the development of more compact and more highly functional projectors. With this development, the use of projectors of the prior art having the purpose of image projection has expanded, and projectors are now receiving attention as large-sized display devices for taking the place of display-type televisions for home use.

However, in contrast with a display-type television, the image plane of a projector may be a screen or a wall, and the problem therefore arises of distortion in the image that results from the relation between the axis of projection of the projector and the projection surface. To provide a solution to this problem, Japanese Patent Laid-Open Publication No. 281597/97 discloses a method that includes a detection means for detecting the installation angle of the liquid crystal projector and a distance detection means for detecting the distance between the liquid crystal projector and the object of projection whereby the angle of the liquid crystal display unit is adjusted according to the angle that is calculated from the two detection results. In addition, Japanese Patent Laid-Open Publication No. 169211/01 discloses a distortion correction method in which: the light spot of a laser pointer for which the angle can be controlled is projected onto a curved screen; a dot image for measurement is generated and projected onto the screen from a projector, the image of the light spot and dot image is captured by a camera and their positions measured; and the dot image is shifted until the two points coincide, whereupon the picture element coordinates of the dot image in a frame memory are converted to the coordinates of the light spot on the input image and set in a coordinate conversion parameter memory. A liquid crystal projector is also disclosed in Japanese Patent Laid-Open Publication No. 197249/97 in which: an image pattern that is projected onto a screen is passed through a slit and received by a line sensor, whereupon the position of the reflected light of this image pattern is used to find the distance to the screen; the image pattern that is projected onto the screen is shifted on the screen and the tilt of the screen is found based on the shift of the position of the reflected light of the image pattern that is passed through the slit and received by the line sensor; and diagonal adjustment is realized by controlling a diagonal actuator to tilt the projector unit backward and forward.

Techniques have already been put into practical use whereby, if the tilt of a screen in perpendicular and horizontal directions with respect to the axis of projection of a projector is known, an image that is free of distortion can be projected onto a screen by converting coordinates in the frame memory of the projector. Thus, Japanese Patent Laid-Open Publication No. 5278/03 already discloses a projector in which, on the premise that the screen is installed perpendicularly, the tilt of the projector is detected by means of a gravity sensor, and the tilt in the perpendicular direction, which in particular tends to produce distortion, is measured and distortion then corrected in accordance with this tilt.

However, the method that is disclosed in Japanese Patent Laid-Open Publication No. 281597/97 requires mechanical adjustment of the angle of the liquid crystal display unit. The method disclosed in Japanese Patent Laid-Open Publication No. 169211/01 requires control of the angle of the laser pointer and therefore entails a complex structure. The method that is disclosed in Japanese Patent Laid-Open Publication No. 197249/97 requires shifting of the image pattern on the screen to detect the angle, and therefore cannot obtain the detection speed necessary for realizing distortion correction in real time. The method that is disclosed in Japanese Patent Laid-Open Publication No. 5278/03 assumes the perpendicular installation of the screen and therefore cannot provide accurate correction of distortion when the screen is not installed perpendicularly or when the screen is tilted in the horizontal direction with respect to the axis of projection of the projector.

SUMMARY OF THE INVENTION

It is an object of the present invention to provide a projector having a tilt angle measurement device for correcting image distortion; this projector being able to accurately measure the angle of tilt of a screen in the horizontal and vertical direction with respect to the axis of projection of the projector by means of a simple configuration.

A projector having a tilt angle measurement device according to the present invention includes a tilt angle measurement device for calculating the tilt angle between the axis of projection of the projector device and the projection surface, and controls the output image of a display unit in accordance with the calculated tilt angle to correct distortion of the image on the projection surface. The tilt angle measurement device includes: a light guide unit that is provided on the projection-side surface of the projector case separated from the axis of projection in a prescribed direction; a photodetection element for receiving, by way of the light guide unit, reflected light from at least two points that are projected onto the projection surface; and a tilt angle calculation unit that calculates the tilt angle between the axis of projection of the projection device of the projector and the projection surface based on photoreaction position information of the reflected light in the photodetection element.

In the first mode of the invention, the tilt angle measurement device is provided with: a laser pointer for projecting at least two spots onto the projection surface; a digital camera having a lens, which is the light guide unit, and a pickup element, which is the photodetection element; and an image-analyzing tilt angle calculation unit, which is the tilt angle calculation unit. A projection port of the laser pointer and the lens of the digital camera are provided on the irradiation-side surface of the projector. The laser pointer projects at least two points onto the projection surface for establishing each vertical and horizontal direction of the projection device. The lens of the digital camera is arranged at a prescribed spacing in the vertical and horizontal directions, from the projection ports of the laser pointer and is able to capture an image of the points on the projection surface. The image-analyzing tilt angle calculation unit, based on the captured image of the pickup element of the digital camera, analyzes the tilt angle between a line that joins points on the projection surface that have been captured by the digital camera, i.e., the photodetection position information, and the reference lines that indicate the vertical direction and horizontal direction of the projection device, and calculates the tilt angle between the axis of projection of the projection device and the projection surface based on this tilt angle.

The laser pointer may be three point-type laser pointers that project points, two line-type laser pointers that project lines, or one crossline-type laser pointer that project orthogonal lines.

The analysis of the tilt angle between the reference lines and the line that joins points that are captured by the digital camera, which is based on the captured image of the pickup element of the digital camera, may be realized by calculating the difference between the picture element numbers of the picture elements that correspond to the intersections of the two edges of the captured image and either of a pointing line or a line that joins points, and then calculating the tilt angle by means of a table that is created beforehand that relates differential picture element numbers to tilt angles.

In the second mode of the present invention, the projection device has a test pattern output function for projecting a planar beam from the projection lens along the reference plane in which the tilt angle is found such that a projected image of a line is formed on the projection surface. The tilt angle measurement device is provided with: a light guide unit; a pair of left and right linear-arranged pickup elements, which are the photodetection elements; and a photodetection position analyzing distance/tilt angle calculation unit, which is the tilt angle calculation unit. The light guide unit is provided on the projection-side surface of the projector case and is separated from the axis of projection in a direction that is orthogonal to the reference plane. The linear-arranged pickup elements are provided in the interior of the case and are arranged in a vertical direction to the left and right of a vertical centerline that is above the axis of projection with respect to the reference plane. The reflected light of the projected image of the line that is projected onto the projection surface is received by way of the light guide unit, and based on the information of the heights and difference in heights of the positions of photodetection of the reflected light in the left and right linear-arranged pickup elements, the photodetection position analyzing distance/tilt angle calculation unit calculates the distance between the projection lens and the projection surface and the tilt angle between the axis of projection of the projection device and the projection surface.

The measured tilt angle may be the tilt angle in the horizontal plane between the projection surface and the axis of projection; and the reference plane may be the horizontal plane that contains the axis of projection. In addition, the tilt angle measurement device may include a vertical tilt sensor for detecting the tilt angle of the axis of projection in the vertical plane that contains the axis of projection of the projector; and the output image of the display unit may be controlled by combining the tilt angle in the vertical plane, that is detected by this vertical tilt sensor, with the tilt angle in the horizontal plane that is calculated from the height and difference in the heights of the photodetection positions of the reflected light in the right and left linear-arranged pickup elements. The measured tilt angle may be the tilt angle in the vertical plane between the projection surface and the axis of projection, and the reference plane may be the vertical plane that contains the axis of projection.

The projection device may be provided with a focus adjustment unit for adjusting the focal point of the projection lens, and the focus adjustment unit may be controlled by the distance between the projection lens and the projection surface that is calculated in the photodetection position analyzing distance/tilt angle calculation unit.

The light guide unit may be a pinhole or an optical lens that is provided in the wall of the projector case.

Control of the output image of the display unit in accordance with the tilt angle between the projection surface and the axis of projection of the projection device may be realized by creating LSI control parameters from the correction values of the input image of the display unit that are calculated in advance for tilt angles and which then controls projector image processing LSI.

The projection device may be a liquid crystal projector that includes a liquid crystal display unit; or may be a DLP (registered trademark) projector that includes a DMD (Digital Micromirror Device) display unit, a color wheel, and a light source.

The ease of calculation of the tilt angle between the projection surface and the axis of projection of the projection device in the horizontal direction and vertical direction allows modification of the image that is projected onto a projection surface to the correct state by shifting the arrangement of picture elements of the image in the liquid crystal display unit.

This effect is obtained because the tilt angle measurement device includes: a light guide unit that is provided on the projection-side surface of the projector case and separated in a prescribed direction from the axis of projection; a photodetection element that receives, by way of the light guide unit, reflected light from at least two points that are projected onto the projection surface; and a tilt angle calculation unit that calculates the tilt angle between the projection surface and the axis of projection of the projection device based on photodetection position information of reflected light in this photodetection element.

The second mode further enables automatic focus adjustment. This capability is obtained because the distance between the projection lens and the projection surface can also be calculated simultaneously in the photodetection position analyzing distance/tilt angle calculation unit based on the photodetection position information of the reflected light in the photodetection element.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
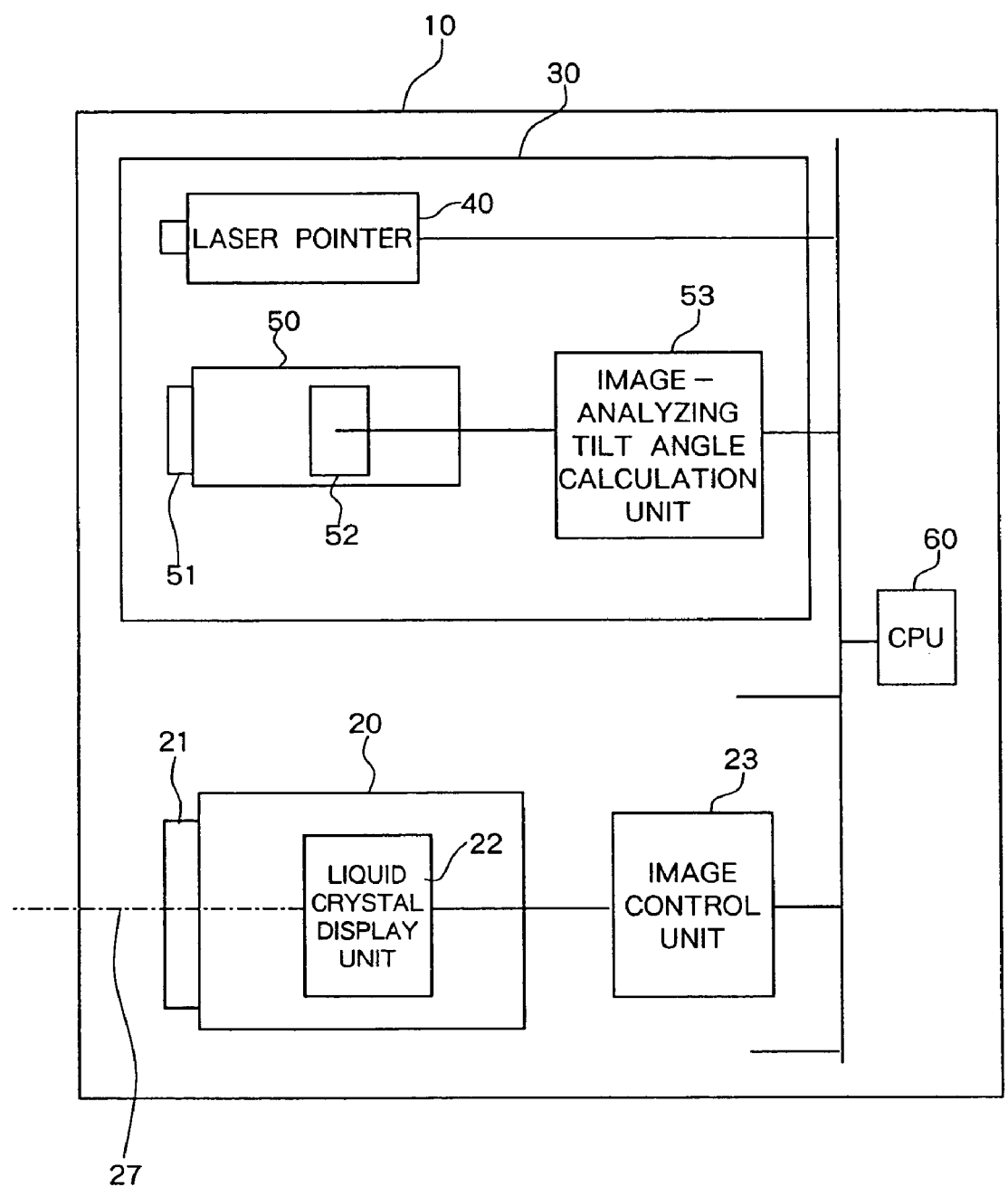
FIG. 1 is a schematic block diagram of a projector having a tilt angle measurement device according to the first mode of the present invention.

In the interest of facilitating understanding, identical constituent elements are referred to by the same names and reference numerals in all modes and working examples in each of the drawings of the present description.

The present explanation regards a case in which projector 10 is a liquid crystal projector, but the present invention can still be applied to a DLP (registered trademark) (Digital Light Processing) projector. In place of liquid crystal display unit 22 that is used for a liquid crystal projector, a DLP projector is normally provided with a DMD (Digital Micromirror Device) display unit, a color wheel, and a light source.

As shown in FIG. 1, projector 10 in the first mode of the present invention is provided with: projection device 20 that includes projection lens 21 and liquid crystal display unit 22; image control unit 23 for controlling the image of liquid crystal display unit 22; tilt angle measurement device 30; and CPU (Central Processing Unit) 60 for controlling overall operations.

Figure 2A:
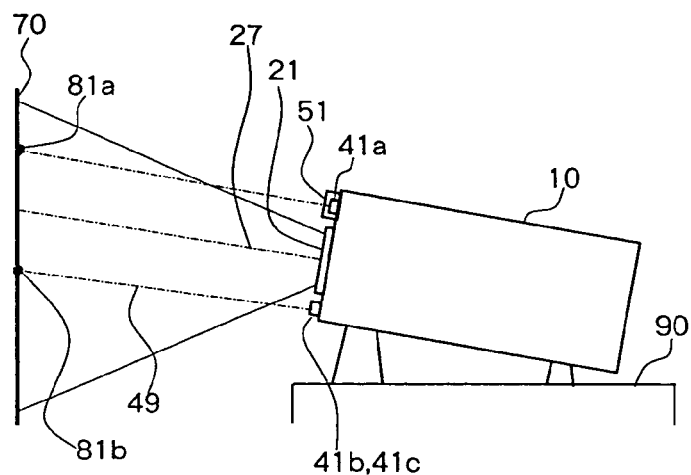
FIG. 2A is a schematic side view showing the state of projection during projection of the projector that has a tilt angle measurement device according to a first working example of the first mode of the present invention.
Figure 2B:
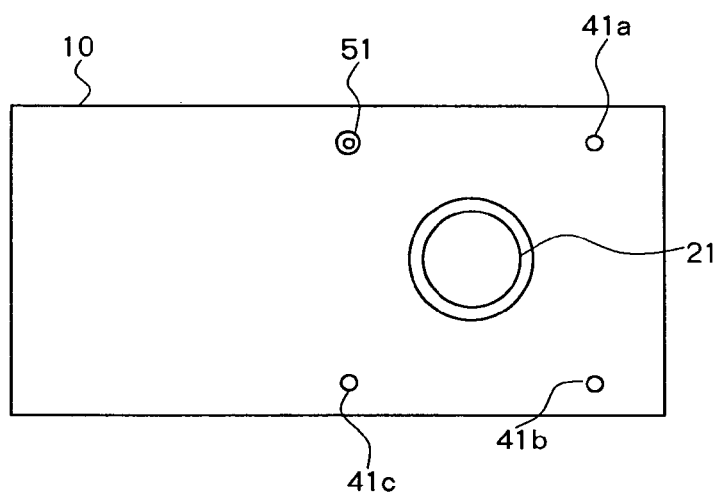
FIG. 2B is a front view of a projector having a tilt angle measurement device according to the first working example of the first mode of the present invention.
Figure 2C:
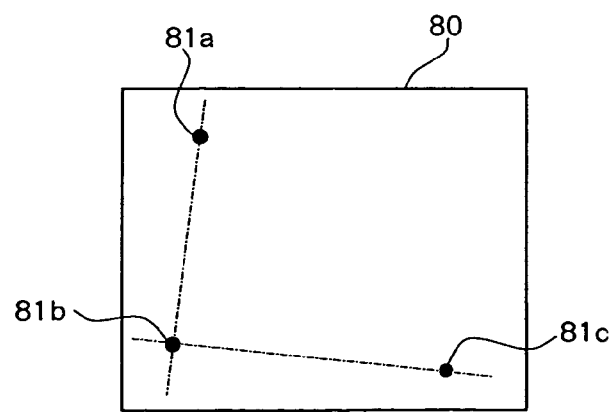
FIG. 2C is a schematic view of the captured image of the digital camera of the projector having a tilt angle measurement device according to the first working example of the first mode of the present invention.

Tilt angle measurement device 30 is provided with: laser pointer 40 for projecting at least two points on the projection surface; digital camera 50 that includes lens 51 and pickup element 52 and image-analyzing tilt angle calculation unit 53. As shown in FIG. 2A and FIG. 2B, the projection ports of laser pointers 41 and lens 51 of digital camera 50 are provided on the illumination-side surface of projector 10. Laser pointers 41 project at least two points 81 onto projection surface 70 for establishing each of the vertical direction and horizontal directions of projection device 20. Lens 51 of digital camera 50 is arranged at a prescribed spacing from the projection ports of laser pointers 41 in the vertical and horizontal direction and can capture images of points 81 of projection surface 70. Based on captured image 80 of pickup element 52 of digital camera 50, image-analyzing tilt angle calculation unit 53 analyzes the tilt angle between the lines that join points 81 of projection surface 70, that are captured by digital camera 50 and reference lines that indicate the vertical and horizontal direction of projection device 20 as shown in FIG. 2C, and calculates the tilt angle between axis of projection 27 of projection device 20 and projection surface 70 based on this tilt angle. Image control unit 23 in accordance with the calculated tilt angle controls the output image of liquid crystal display unit 22, and image distortion on projection surface 70 is thus corrected.

Figure 6:
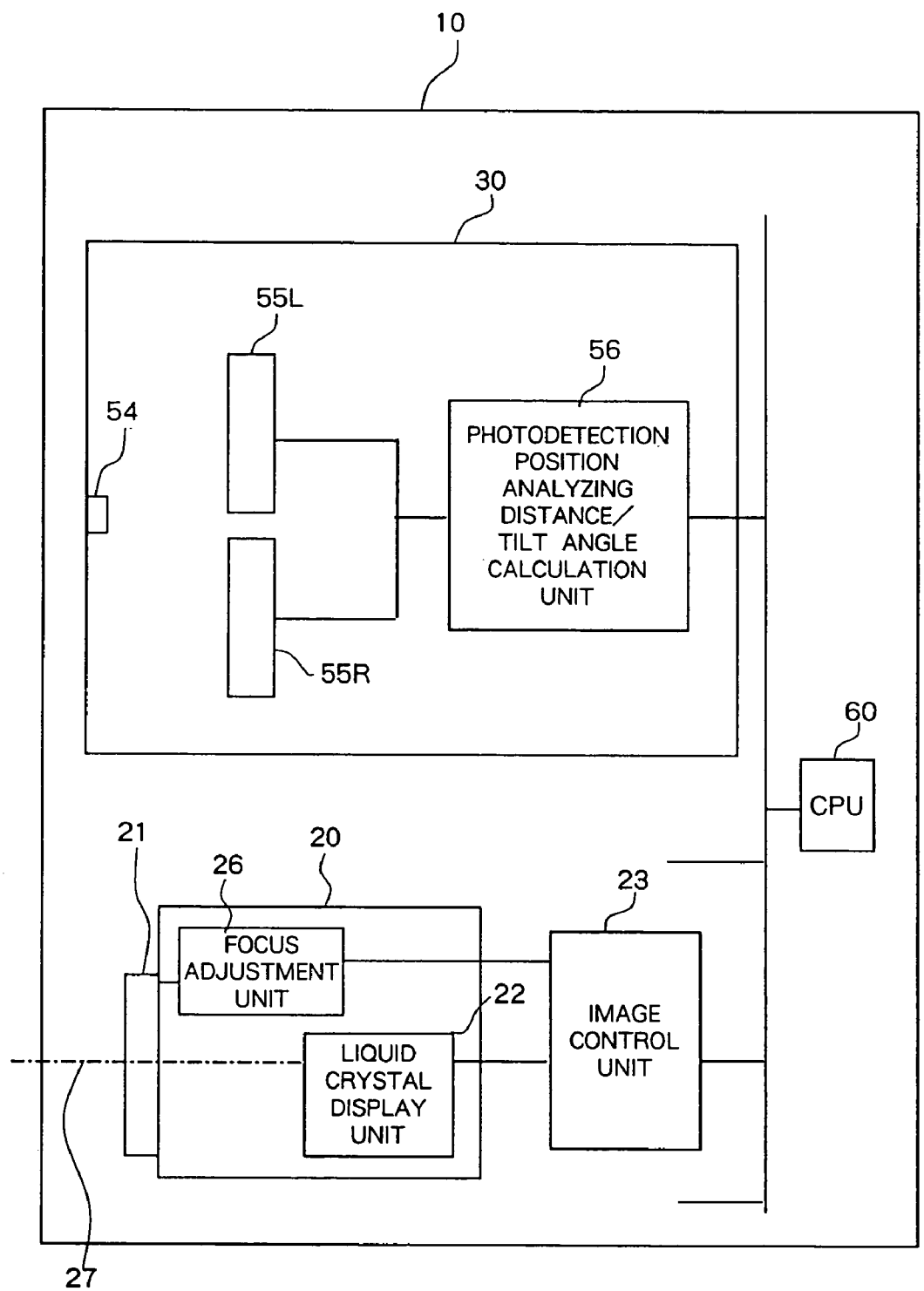
FIG. 6 is a schematic block diagram of the projector having a tilt angle measurement device according to the first working example of the second mode of the present invention.

As shown in FIG. 6, projector 10 in the second mode of the present invention is provided with: projection device 20 that includes projection lens 21, focus adjustment unit 26, and liquid crystal display unit 22; image control unit 23 that controls liquid crystal display unit 22; tilt angle measurement device 30, and CPU 60 that controls overall operations.

Figure 7A:
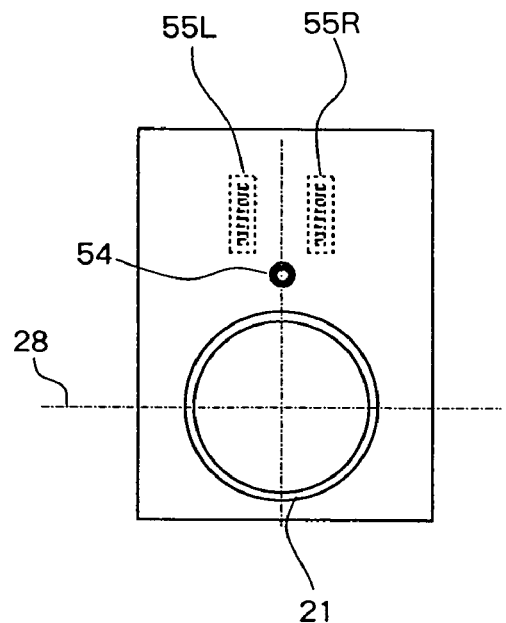
FIG. 7A is a front view of the projector having a tilt angle measurement device according to the first working example of the second mode of the present invention.
Figure 7B:
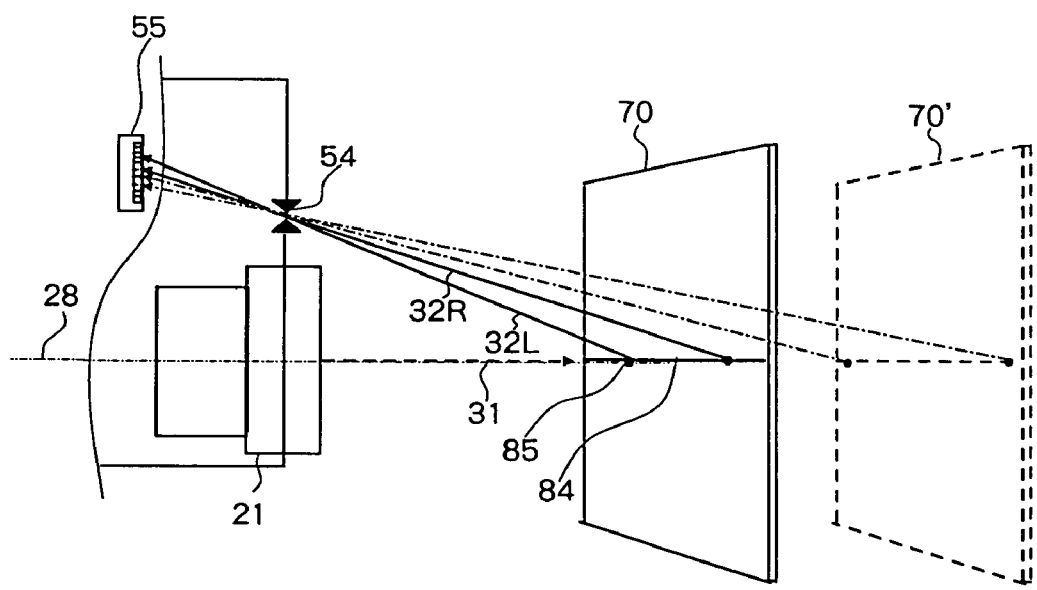
FIG. 7B is a schematic side view showing the state of projection of the projector having a tilt angle measurement device according to the first working example of the second mode of the present invention.

Projection device 20 has a test pattern output function for projecting a planar light beam from projection lens 21 that follows reference plane 28 in which the tilt angle with respect to projection surface 70 is found such that a projected image of a line is formed on projection surface 70. Tilt angle measurement device 30 is provided with pinhole 54, a left-right pair of linear-arranged pickup elements 55L and 55R, and photodetection position analyzing distance/tilt angle calculation unit 56. Pinhole 54 is provided on the projection-side surface of the case of projector 10 separated from axis of projection 27 in a direction that is orthogonal to reference plane 28. Linear-arranged pickup elements 55 are provided inside the case and arranged in a vertical direction at equal spacing to the left and right of a centerline that is vertically above axis of projection 27 with respect to reference plane 28. As shown in FIG. 7B, reflected light 32 from linear projected image 84 that is projected onto projection surface 70 is photodetected by way of pinhole 54. Photodetection position analyzing distance/tilt angle calculation unit 56 calculates the distance from projection lens 21 of projector 10 to projection surface 70 and the tilt angle between axis of projection 27 of projection device 20 and projection surface 70 based on the information of the heights and difference of heights of the photodetection positions of reflected light 32 in the left-right pair of linear-arranged pickup elements 55. Image control unit 23 corrects the image distortion on projection surface 70 in regard to the output image of liquid crystal display unit 22 in accordance with this calculated tilt angle. In addition, focus adjustment unit 26 is controlled based on the calculated distance from projection lens 21 to projection surface 70, whereby the focus of projection lens 21 can be adjusted.

Explanation next regards the first working example of the first mode of the present invention. The configuration is identical to that of the above-described first mode, and explanation of the configuration is therefore omitted here. As shown in FIG. 2A, projector 10 is disposed on stand 90 and normally vertically tilted such that an image is projected upon projection surface 70 such as a screen or a wall. In this case, when projection is realized in which the axis of projection 27 of projection device 20 is orthogonal to projection surface 70, the image plane of liquid crystal display unit 22 is enlarged and projected onto the projection plane without alteration, but the tilt of axis of projection 27 of projection device 20 with respect to projection surface 70 causes variation in the distance from projection lens 21, this variation depends on the location when compared with a case in which axis of projection 27 is orthogonal to projection surface 70, giving rise to the problem of distortion in the projected image plane due to, for example, the enlargement of the image plane at points that are more distant from projection lens 21. Various designs have been employed to solve this problem, including those designs proposed in the above-described patent documents. If the tilt angle between the axis of projection 27 of projection device 20 and projection surface 70 can be accurately gauged in such a case, the image that is projected onto projection surface 70 can be modified to the correct form by shifting the arrangement of picture elements of the image of liquid crystal display unit 22 via means image control unit 23, and the degree of shifting can be found numerically from the tilt angle.

The present invention takes as an object the accurate assessment of the tilt angle between the axis of projection 27 of projection device 20 and projection surface 70, and tilt angle measurement device 30 that is described hereinbelow achieves this object.

In tilt angle measurement device 30, as shown in FIG. 2B, three point-type laser pointers 41a, 41b, and 41c and lens 51 of digital camera 50 having photodetection element 52 are arranged so as to be positioned at the apices of a square that surrounds projection lens 21 of projection device 20. This arrangement need not be an accurate square.

Laser beams 49 from the three point-type laser pointers 41a, 41b, and 41c connect with points 81a, 81b, and 81c on projection surface 70. FIG. 2C represents captured image 80 when points 81a, 81b, and 81c on projection surface 70 are captured by pickup element 52 of digital camera 50. The upper portion of projection surface 70 tilts away from laser pointer 41a, and in the image of pickup element 52, that is captured at a position, that is separated in a horizontal direction from laser pointer 41a as well as laser pointer 41b, point 81a of laser pointer 41a is therefore displayed at a position that is farther to the right than point 81b of laser pointer 41b in the figure. Similarly, although not shown in the figure, the left side of projection surface 70 is tilted away from laser pointer 41b, and in the image of pickup element 52, that is taken at a position that is vertically separated from laser pointer 41b as well as laser pointer 41c, point 81b of laser pointer 41b is therefore displayed at a position that is higher than that of point 81c of laser pointer 41c.

In image-analyzing tilt angle calculation unit 53, the position of each point in captured image 80 is analyzed based on its picture element position, and the tilt angle between axis of projection 27 of projection device 20 and projection surface 70 in both the vertical and horizontal direction is calculated by means of a prescribed calculation formula, and the result is supplied as output to image control unit 23. Based on these tilt angles, image control unit 23 uses a prescribed calculation formula to shift the arrangement of the picture elements of the image of liquid crystal display unit 22 and thus modify the image that is projected onto projection surface 70 to the correct form.

Figure 3A:
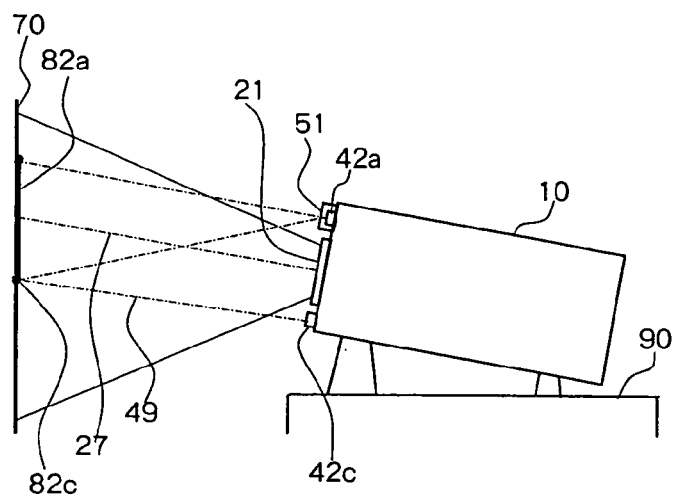
FIG. 3A is a schematic side view showing the state of projection of the projector having a tilt angle measurement device according to the second working example of the first mode of the present invention.
Figure 3B:
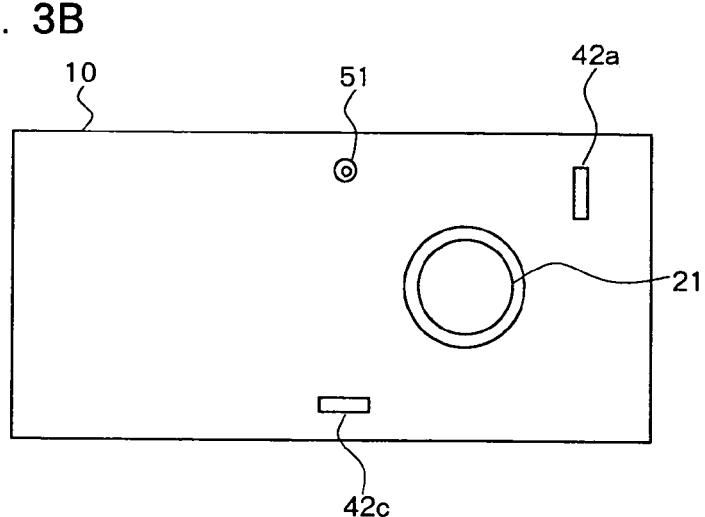
FIG. 3B is a front view of the projector having a tilt angle measurement device according to the second working example of the first mode of the present invention.

In the first working example of the first mode, three point-type laser pointers 41a, 41b, and 41c and lens 51 of digital camera 50 that has pickup element 52 are each arranged so as to be positioned at the apices of a square that surrounds projection lens 21 of projection device 20. In the second working example of the first mode, however, as shown in FIG. 3A and FIG. 3B, one line-type laser pointer 42a that projects a vertical pointing line is arranged at a position that is horizontally symmetrical with the position of lens 51 of digital camera 50 around the vertical centerline of projection lens 21, and one line-type laser pointer 42c that projects a horizontal pointing line is arranged at a position that is vertically symmetrical with the position of lens 51 of digital camera 50 around the horizontal centerline of projection lens 21.

Figure 3C:
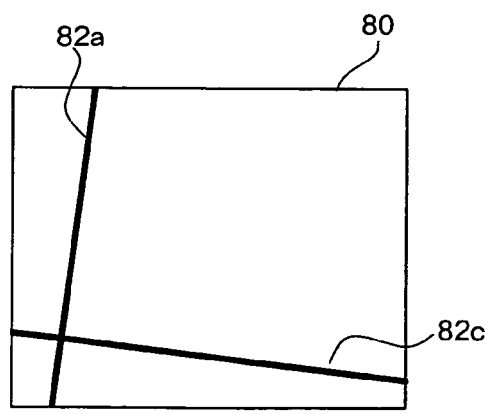
FIG. 3C is a schematic view of the captured image of the digital camera of the projector having a tilt angle measurement device according to the second working example of the first mode of the present invention.

Line-type laser pointers 42a and 42c are laser pointers that can display lines and are often found among high-class laser pointers, and these line-type laser pointers 42a and 42c irradiate projection surface 70 as pointing lines 82a and 82c. The tilt angle may therefore be calculated in image-analyzing tilt angle calculation unit 53 by analyzing the picture element positions of pointing lines 82a and 82c in captured image 80 that is shown in FIG. 3C. It is also possible for example to acquire the picture element positions of the intersections of the two edges of captured image 80 with each of pointing lines 82a and 82c, calculate the difference in the picture element numbers of the two picture element positions, and then compute the tilt angle through the use of a table that has been prepared in advance that correlates differential picture element numbers with tilt angles, whereby the process can be simplified over the first working example.

Figure 4:
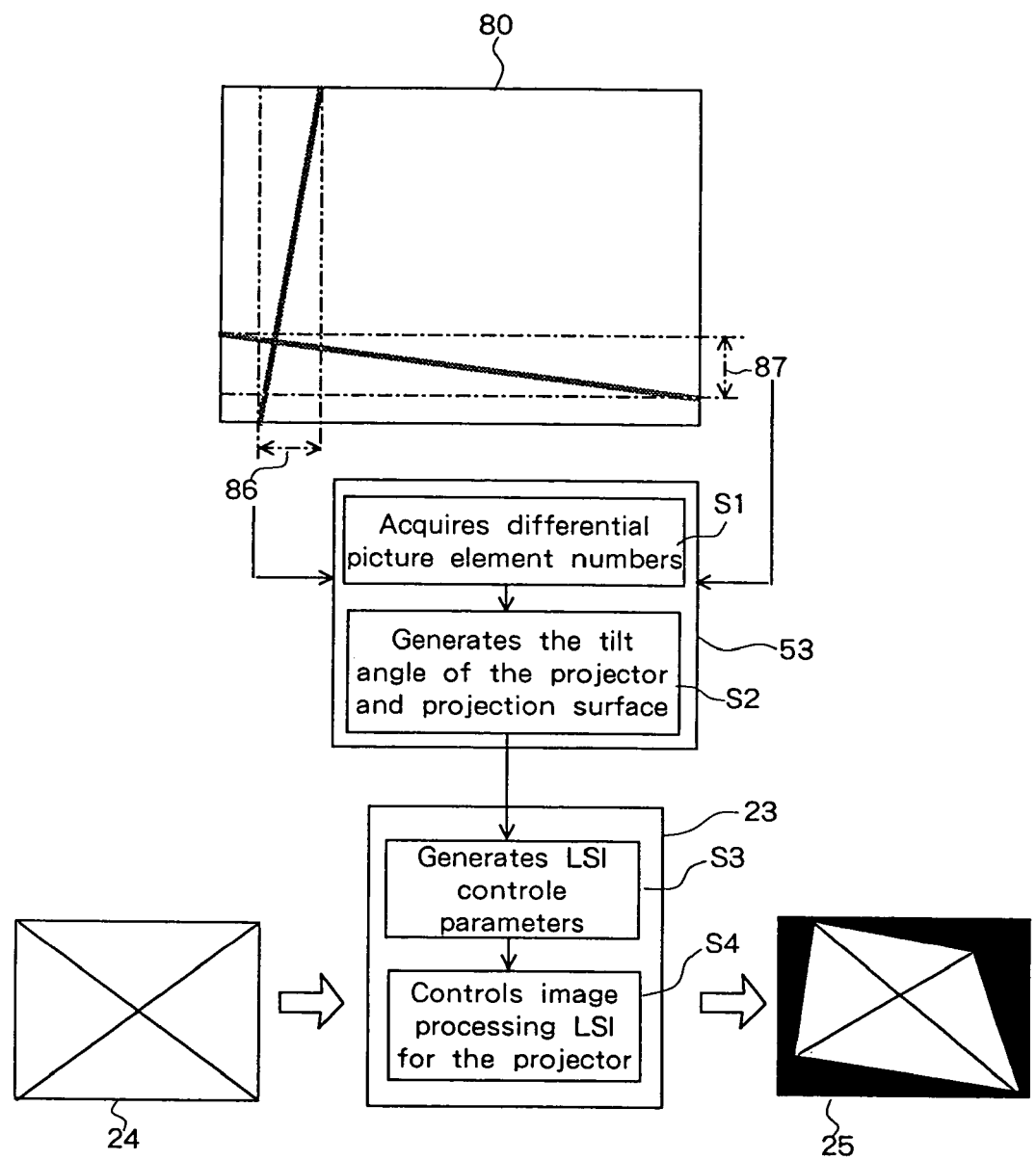
FIG. 4 shows a schematic flow chart showing the steps to correct the output image of the liquid crystal display unit based on the differential picture element numbers in the first mode.

As shown in FIG. 4, image-analyzing tilt angle calculation unit 53 acquires differential picture element number information from captured image 80 of pickup element 52 for vertical differential picture element number 86 and horizontal differential picture element number 87 (Step S1), and based on this differential picture element number information, generates the tilt angle between the axis of projection 27 of projection device 20 and projection surface 70 (Step S2). Image control unit 23 receives the generated tilt angle and generates LSI control parameters (Step S3) and controls image processing LSI for the projector (Step S4), whereby input image 24 is corrected to become output image 25 on liquid crystal display unit 22. This output image 25, when projected onto projection surface 70, becomes an image that approximates input image 24.

Figure 5A:
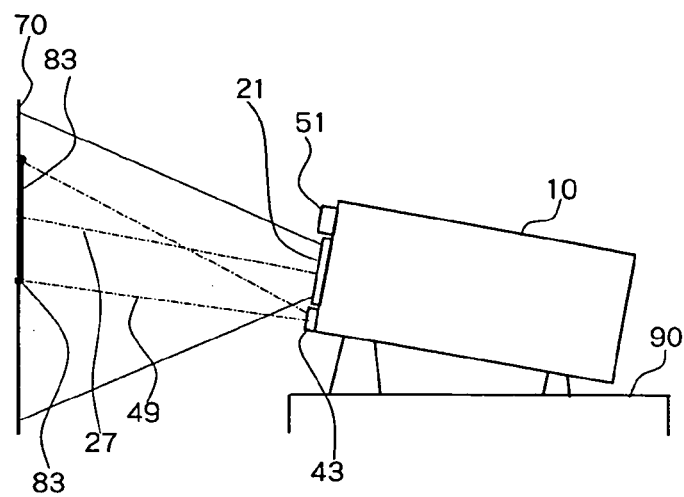
FIG. 5A is a schematic side view showing the state of projection of the projector having a tilt angle measurement device according to the third working example of the first mode of the present invention.
Figure 5B:
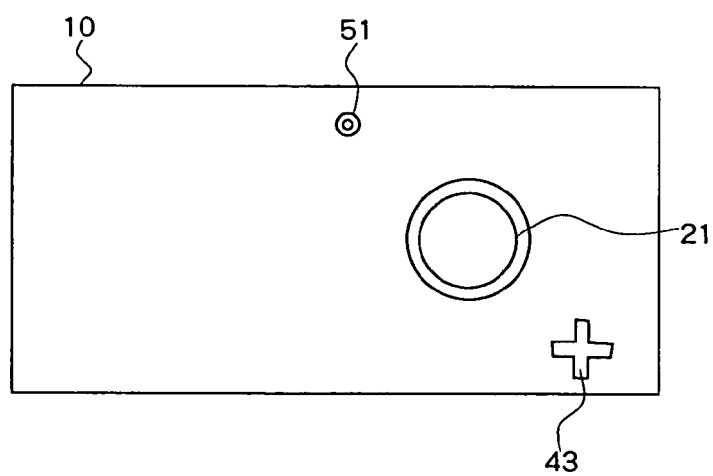
FIG. 5B is a front view of the projector having a tilt angle measurement device according to the third working example of the first mode of the present invention.

In the second working example of the first mode, two line-type laser pointers 42a and 42c were arranged at positions that are horizontally and vertically symmetrical to lens 51 of digital camera 50 around the vertical center line and horizontal center line, respectively, of projection lens 21, but in the third working example of the first mode, one crossline-type laser pointer 43 is arranged at a position that is symmetrical to lens 51 of digital camera 50 on a diagonal line with projection lens 21 of projection device 20 that is interposed, as shown in FIGS. 5A and 5B.

Figure 5C:
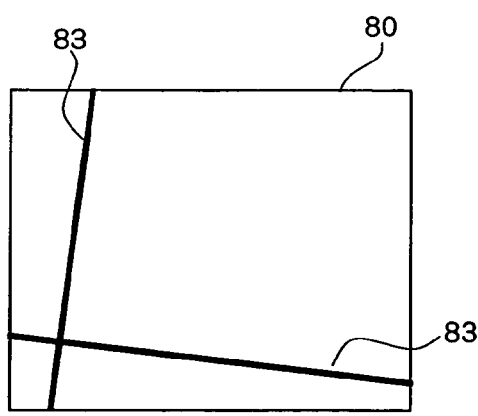
FIG. 5C is a schematic view of the captured image of the digital camera of the projector having a tilt angle measurement device according to the third working example of the first mode of the present invention.

Crossline-type laser pointer 43 is a laser pointer that is capable of displaying a crossline and that is found in high-level laser pointers, and this crossline-type laser pointer 43 irradiates pointing lines 83 onto projection surface 70 that are similar to the pointing lines in the second working example of the first mode. The picture elements of pointing lines 83 in captured image 80 that are shown in FIG. 5C may then be analyzed in image-analyzing tilt angle calculation unit 53 to calculate the tilt angle, or, as described hereinabove, the differences in the picture element numbers at the picture element positions of the intersections of both edges of captured image 80 with pointing lines 83, may be calculated and the tilt angle then calculated through the use of a table that has been prepared in advance that correlates the differential picture element numbers with tilt angles.

Explanation next regards the first working example of the second mode of the present invention. The configuration of this mode is identical to that of the above-described second mode and is therefore omitted here.

Figure 7C:
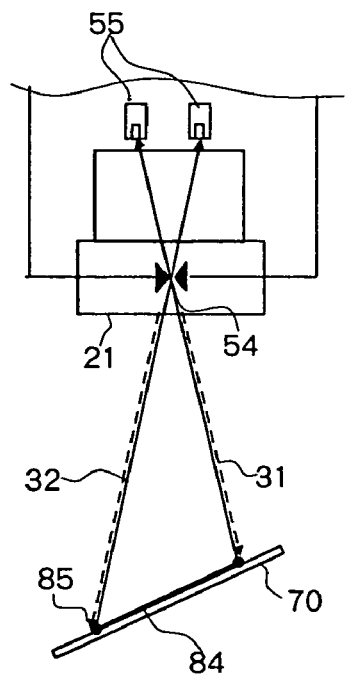
FIG. 7C is a schematic overhead view showing the state of projection of the projector having a tilt angle measurement device according to the first working example of the second mode of the present invention.

In contrast with a case in which projection surface 70 is orthogonal to the axis of projection 27, when projection surface 70, such as a screen or wall, is inclined with respect to the axis of projection 27 as shown in FIG. 7B and FIG. 7C, the distance of projection surface 70 from projection lens 21 varies by position, and because the image therefore expands at positions that are more distant from projection lens 21, the problem of distortion arises in the projected image. In this case, if the tilt angle between the axis of projection 27 of projection device 20 and projection surface 70 can be accurately gauged, the image that is projected onto projection surface 70 can be modified to the correct form by shifting the arrangement of picture elements of the image of liquid crystal display unit 22 by means image control unit 23, and the degree of shifting can be found numerically from the tilt angle.

Figure 7D:
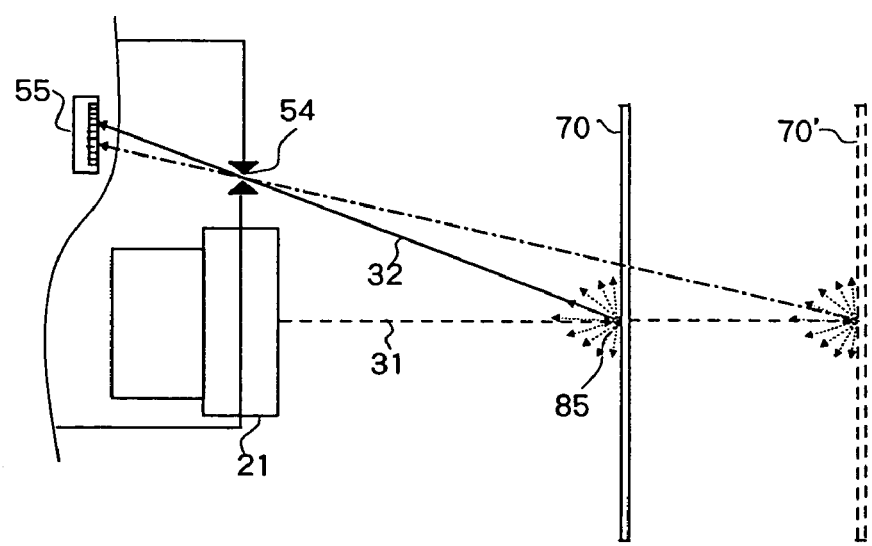
FIG. 7D is a schematic view showing the state of reflection, from a vertical projection surface, of a planar light beam that is projected in the reference plane according to a test pattern output function of the projection device of the projector that has a tilt angle measurement device according to the first working example of the second mode of the present invention.

Projection device 20 includes a test pattern output function for projecting a planar beam from projection lens 21 along reference plane 28 in which the tilt angle with projection surface 70 is to be found such that projected image 84 of a straight line is formed on projection surface 70. As shown in FIG. 7D, projection beam 31 is reflected in a vertical direction as reflected beam 32 that is centered on projected image 84. As shown in FIG. 7A, pinhole 54 of tilt angle measurement device 30 is provided in the projection-side surface of the case of projector 10 at a distance from the axis of projection 27 in a direction that is orthogonal to reference plane 28. In addition, linear-arranged pickup elements 55L and 55R are provided vertically inside the case with the linear-arranged pickup elements 55L and 55R being equally spaced to the left and right of a vertical line above the axis of projection 27 with respect to reference plane 28. In regard to reflected beam 32 from linear projected image 84 that is projected onto projection surface 70, linear-arranged pickup elements 55L and 55R photodetect the reflected light 32 that is incident by way of pinhole 54. If projection surface 70 is assumed to be perpendicular to the axis of projection 27 as shown in FIG. 7D, the positions of photodetection, (i.e., the heights, in linear-arranged pickup elements 55L and 55R that are positioned vertically and arranged in left-right symmetry) will be equal on the left and right. If projection surface 70 recedes as far as the position of projection surface 70', however, reflected beam 32 that passes through pinhole 54 will shift to the position that is shown by the chain line, and the photodetection positions in linear-arranged pickup elements 55L and 55R will be lower. Thus, based on the photodetection positions in linear-arranged pickup elements 55L and 55R, the distance between projection lens 21 and projection surface 70 can be calculated through the use of a table that has been prepared in advance.

When projection surface 70 is perpendicular to the axis of projection 27 as shown in FIG. 7D, the positions of detection in both linear-arranged pickup elements 55L and 55R will be the same height, but if projection surface 70 is tilted horizontally with respect to the axis line of axis of projection 27 in reference plane 28 as shown in FIG. 7B and FIG. 7C, the height of the photodetection positions in the left and right linear-arranged pickup elements 55L and 55R will differ. However, the average height will be the height of reflected beam 32 in the perpendicular direction in the axis of projection 27 that is produced by projected beam 31, and the distance between projection lens 21 and projection surface 70 can therefore be calculated by means of this average height.

When projection surface 70 is horizontally tilted with respect to the axis line in reference plane 28 as shown in FIGS. 7B and 7C, the heights of the photodetection positions in left and right linear-arranged pickup elements 55L and 55R will differ as shown in the figures, but as described hereinabove, these heights correspond to the distances between projection lens 21 and the points of reflection in projected image 84 of reflected beams 32 that are incident to linear-arranged pickup elements 55L and 55R. Accordingly, finding the difference in these heights enables the finding of an approximate value of the difference in distance between projection lens 21 and each of input beam reflection points 85 in projected image 84 of reflected beams 32 that are incident to linear-arranged pickup elements 55L and 55R. The spacing between these input beam reflection points 85 can be calculated from: the spacing between left and right linear-arranged pickup elements 55L and 55R, the distance between pinhole 54 and the line that joins the left and right linear-arranged pickup elements, and the distance between pinhole 54 and reflection surface 70 that approximates the distance between projection lens 21 and reflection surface 70. Accordingly, the tilt angle within, reference plane 28 between the axis of projection 27 and projection surface 70 can be calculated from: the distance between input beam reflection points 85, and the difference between the distances between projection lens 21 and each of the input beam reflection points 85 in projected image 84 of reflected beams 32 that are incident to linear-arranged pickup elements 55L and 55R. Distortion in the image on projection surface 70 is corrected by controlling at image control unit 23 over the output image of liquid crystal display unit 22 in accordance with the tilt angles that are thus calculated. In addition, the focus of projection lens 21 can also be adjusted by controlling focus adjustment unit 26 based on the distance that has been calculated between projection lens 21 and projection surface 70.

Figure 8:
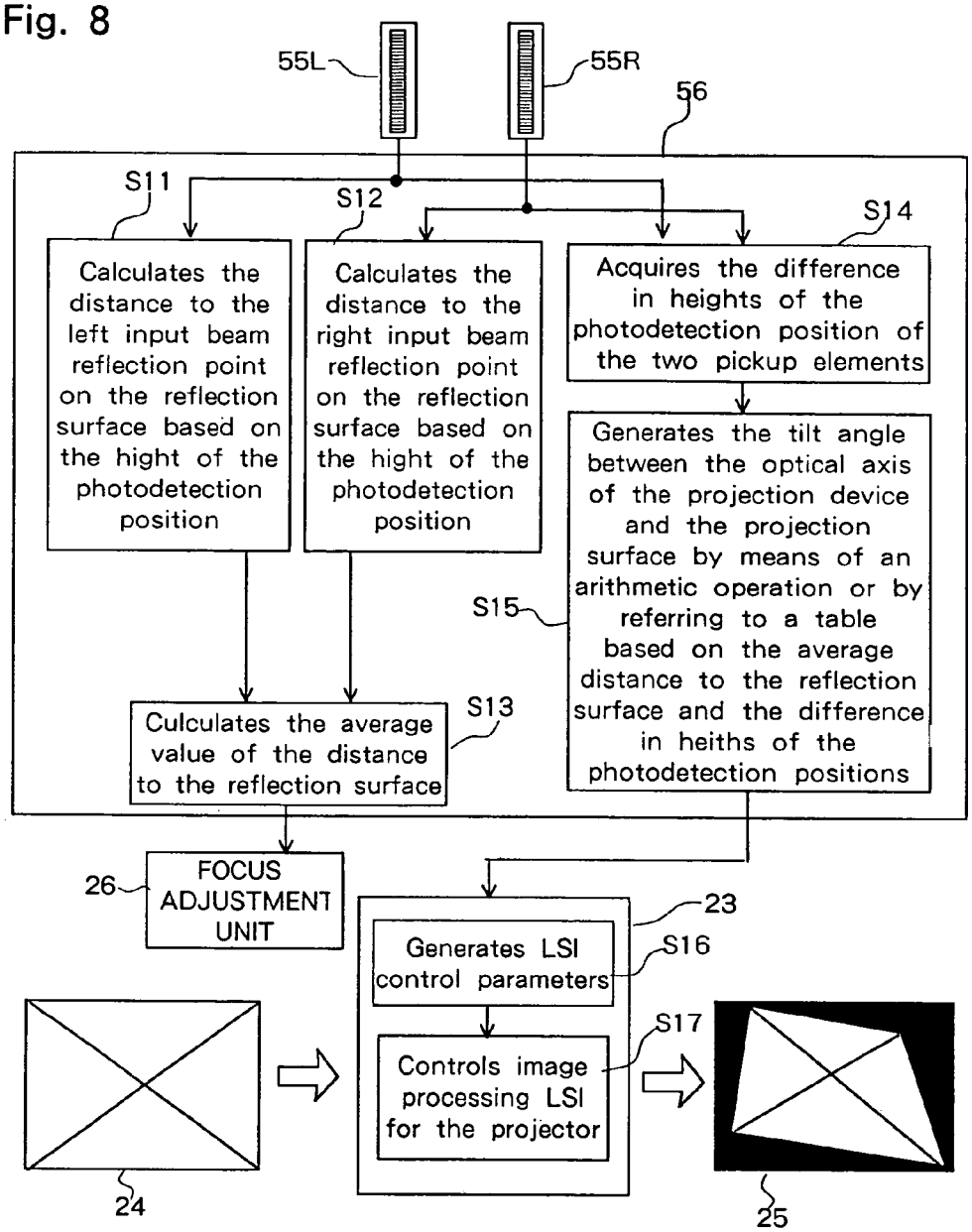
FIG. 8 is a schematic flow chart showing the steps to correct the output image of a liquid crystal display unit based on the photodetection positions, in the linear-arranged pickup element that is arranged as a left-right pair, of reflected light from the projection surface of the test pattern projection image.

Referring now to FIG. 8, explanation next regards the steps for amending the output image of liquid crystal display unit 22 based on the photodetection positions, in linear-arranged pickup elements 55 that are arranged as a left/right pair, of reflected beams 32 from the test pattern projection image on projection surface 70.

Photodetection position analyzing distance/tilt angle calculation unit 56 calculates the distance to left input beam reflection point 85 based on the height of the photodetection position in left linear-arranged pickup element 55L (Step S11), calculates the distance to right input beam reflection point 85 based on the height of the photodetection position in right linear-arranged pickup element 55R (Step S12), and then calculates the average value of the distance to reflection surface 70 (Step S13).

Photodetection position analyzing distance/tilt angle calculation unit 56 next acquires the difference in heights of the photodetection positions in left and right linear-arranged pickup elements 55L and 55R (Step S14), and based on the average value of the distance to reflection surface 70 and the difference in heights of the photodetection positions in left and right linear-arranged pickup elements 55L and 55R, generates the tilt angle between optical axis 27 of projection device 20 and projection surface 70 by performing an arithmetic operation or by referring to a table (Step S15).

Image control unit 23 receives the generated tilt angle and generates LSI control parameters (Step S16), and controls image processing LSI for the projector (Step S17), whereby input image 24 is corrected to become output image 25 on liquid crystal display unit 22. This output image 25 is an image that approximates input image 24 when projected onto projection surface 70. Focus servomotor of focus adjustment unit 26 can be controlled by means of the average value of the distance to reflection surface 70 to enable adjustment of the focal point of projection lens 21 to projection surface 70.

Explanation up to this point has concerned the measurement of the tilt angle in the horizontal direction, but using pinhole 54 and linear-arranged pickup elements 55 at positions that are rotated 90° around axis of projection 27 enables measurement of the tilt angle in the vertical direction.

Figure 9:
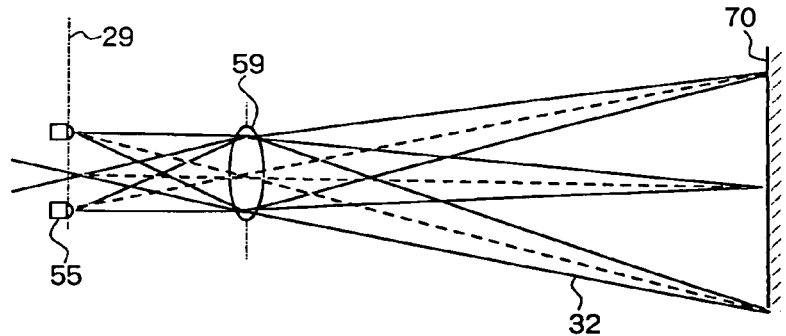
FIG. 9 is a schematic view showing the input of reflected light from the projection surface to the linear-arranged pickup element when using a convex lens as the light guide unit.

In addition, in the explanation up to this point, the light guide unit was a pinhole, but the same measurement can be realized if the light guide unit is an optical lens. When convex lens 59 is used as shown in FIG. 9, reflected beam 32 from projection surface 70 is incident to linear-arranged pickup elements 55 similar to reflected beam 32 from projection surface 70 when pinhole 54 is used.

Figure 10:
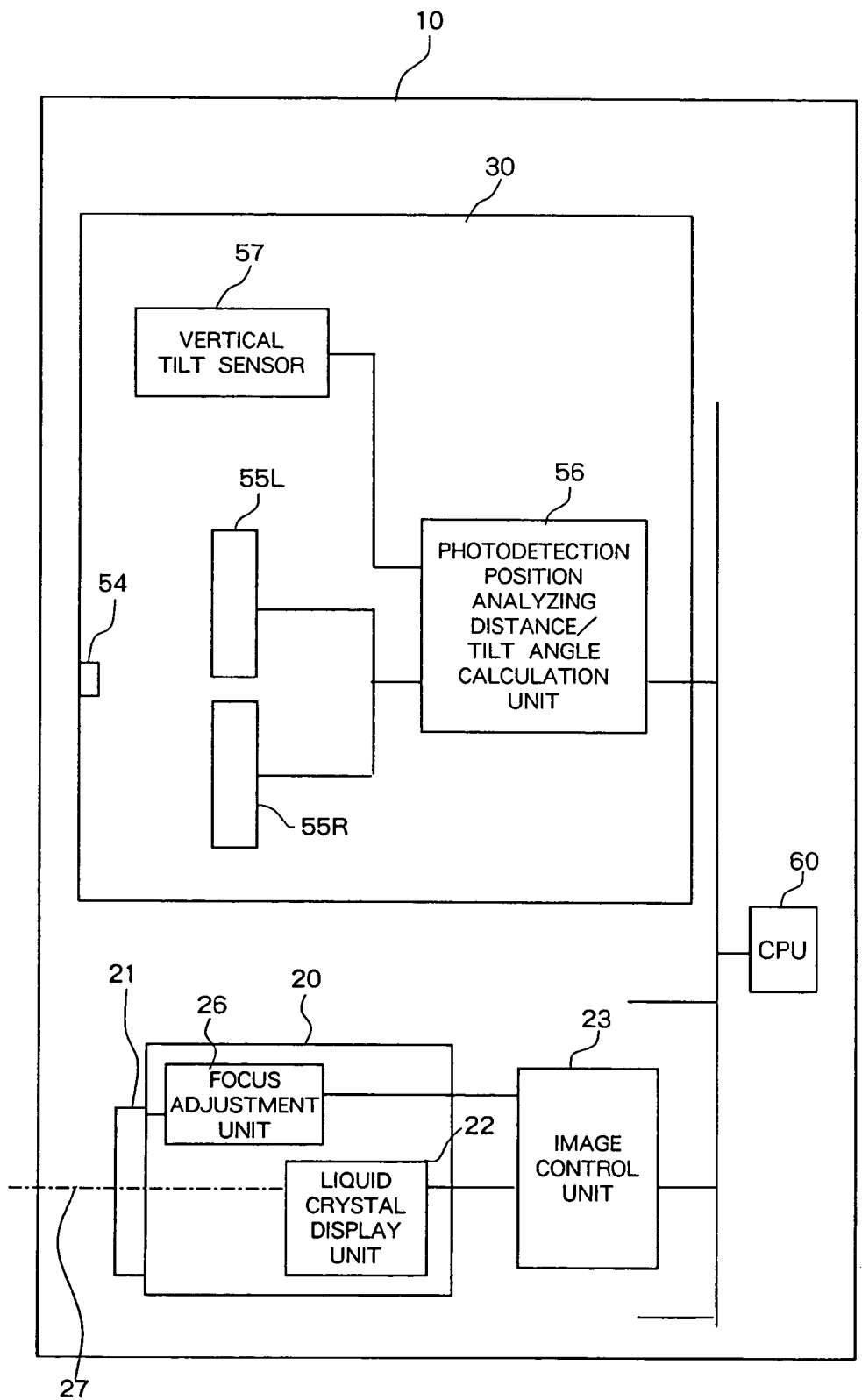
FIG. 10 is a schematic block diagram of the projector having a tilt angle measurement device according to the second working example of the second mode of the present invention.

As shown in FIG. 10, the configuration and operation of the second working example of the second mode are identical to the first working example of the second mode except for tilt angle measurement device 30 of vertical tilt sensor 57, which is a tilt sensor (G-sensor) that employs an acceleration detection element that is also used in, for example, centering when setting up the machine, and which precisely measures tilt angle with respect to the direction of gravity and supplies the result as numerical data. Identical constituent elements are therefore given the same reference numerals and redundant explanation of these parts is omitted here.

Tilt angle in the vertical direction that is detected by vertical tilt sensor 57 is applied as input to photodetection position analyzing distance/tilt angle calculation unit 56. In photodetection position analyzing distance/tilt angle calculation unit 56, tilt angle in the horizontal direction is calculated by means of photodetection position information that is measured by the pair of linear-arranged pickup elements 55 and combined with the tilt angle in the vertical direction that is detected by vertical tilt sensor 57 and supplied as output to image control unit 23. Image control unit 23 adds the tilt in the vertical and horizontal directions and generates LSI control parameters. In this case as well, the same process is carried out as described in the first working example when convex lens 59 is used in place of pinhole 54 in the light guide unit. It is to be understood, however, that although the characteristics and advantages of the present invention have been set forth in the foregoing description, the disclosure is illustrative only, and changes may be made in the arrangement of the parts within the scope of the appended claims.

What is claimed is:

1. A projector having a tilt angle measurement device for projecting an image onto a projection surface, said projector comprising:
   a projection device for projecting an image onto said projection surface;
   a tilt angle measurement device for calculating the tilt angle that is formed between an axis of projection of said projection device and said projection surface; and
   an image control unit for controlling an output image of said projection device in accordance with the calculated tilt angle to correct distortion in the image that is projected onto said projection surface;
   wherein said tilt angle measurement device comprises:
      a light guide unit that is provided on a projection-side surface of a case of said projector and that is separated in a prescribed direction from said axis of projection;
      a photodetection element for receiving, by way of said light guide unit, reflected light from at least two points that are projected onto said projection surface; and
      a tilt angle calculation unit for calculating the tilt angle that is formed between said axis of projection of said projection device and said projection surface based on photodetection position information of said reflected light of said photodetection element.

2. A projector having a tilt angle measurement device according to claim 1, wherein:
   said tilt angle measurement device is provided with:
      a laser pointer for projecting at least two spots onto said projection surface;
      a digital camera having: a lens, which is said light guide unit; and
      a pickup element, which is said photodetection element; and
      an image-analyzing tilt angle calculation unit, which is said tilt angle calculation unit;
   a projection port of said laser pointer and the lens of said digital camera are provided on a projection-side surface of said projector;
   said laser pointer projects at least two points onto said projection surface for establishing each vertical direction and a horizontal direction of said projection device;
   the projection port of said laser pointer is arranged at a prescribed spacing from said lens of said digital camera in a vertical and/or horizontal direction, and said digital camera is capable of capturing an image of said points on said projection surface; and
   said image-analyzing tilt angle calculation unit analyzes the captured image of said pickup element of said digital camera to acquire a tilt angle between a line that joins points of an image on said projection surface that has been captured by said digital camera, this being photodetection position information, and a reference lines that indicate the vertical direction and horizontal direction of said projection device, and based on this tilt angle, calculates the tilt angle that is formed between said axis of projection of said projection device and said projection surface.

3. A projector having a tilt angle measurement device according to claim 2, wherein:

said laser pointer is a point-type laser pointer that projects a point; and three said point-type laser pointers and said lens of said digital camera are arranged such that each is located at the respective apex of a square surrounding the projection lens of said projection device.

4. A projector having a tilt angle measurement device according to claim 2, wherein:

said laser pointer is a line-type laser pointer that projects a line; and surrounding the projection lens of said projection device, one line-type laser pointer that projects a vertical pointing line is arranged at a position that is horizontally symmetrical to said digital camera lens around the vertical centerline of said projection lens, and one line-type laser pointer that projects a horizontal pointing line is arranged at a position that is vertically symmetrical to said digital camera lens around the horizontal centerline of said projection lens.

5. A projector having a tilt angle measurement device according to claim 2, wherein:

said laser pointer is a crossline-type laser pointer that projects orthogonal lines; and one crossline-type laser pointer is arranged at a position that is symmetrical to said digital camera lens on a diagonal line with said projection lens of said projection device interposed, such that said crossline-type laser pointer projects horizontal and vertical pointing lines.

6. A projector having a tilt angle measurement device according to claim 2, wherein the analysis of the tilt angle between said reference lines and said line that joins points that are captured by said digital camera, which is based on a captured image of the pickup element of said digital camera, is realized by:

finding picture element positions that correspond to the intersections of said line that joins points and the two edges of said captured image, and calculating the difference in the picture element numbers of these two picture element positions; and computing the tilt angle by means of a table that is prepared beforehand that correlates differential picture element numbers with tilt angles.

7. A projector having a tilt angle measurement device according to claim 2, wherein the control of the output image of said display unit in accordance with a tilt angle that is formed between the axis of projection of said projection device and said projection surface is realized by preparing LSI control parameters by means of correction values of input images of said display unit that are calculated in advance to correspond with said tilt angles, and which then controls the image processing LSI for the projector.

8. A projector having a tilt angle measurement device according to claim 2, wherein said projection device includes a liquid crystal display unit.

9. A projector having a tilt angle measurement device according to claim 2, wherein said projection device includes a DMD (Digital Micromirror Device) display unit, a color wheel, and a light source.

10. A projector having a tilt angle measurement device according to claim 1, wherein:

said projection device has a test pattern output function for projecting, from the projection lens of said projection device, a planar light beam along a reference plane in which said tilt angle is found, such that a linear projected image that is composed of continuous points is formed on said projection surface;

said tilt angle measurement device is provided with:

said light guide unit;

a left/right pair of linear-arranged pickup elements which are said photodetection elements; and a photodetection position analyzing distance/tilt angle calculation unit which is said tilt angle calculation unit;

wherein:

said light guide unit is provided on the projection-side surface of the case of said projector and is separated from said axis of projection in a direction that is orthogonal to said reference plane;

said linear-arranged pickup elements are provided in the interior of said case in a vertical direction to the left and right of a vertical centerline that is above said axis of projection with respect to said reference plane, and, by way of said light guide unit, photodetect the reflected light of said linear projected image that is projected onto said projection surface; and said photodetection position analyzing distance/tilt angle calculation unit, based on the information of the heights and difference in heights of the positions of photodetection of said reflected light in said left and right linear-arranged pickup elements, calculates the distance between said projection lens and said projection surface and the tilt angle that is formed between said axis of projection of said projection device and said projection surface.

11. A projector having a tilt angle measurement device according to claim 10, wherein the tilt angle that is measured is a tilt angle formed in a horizontal direction between said axis of projection and said projection surface, and said reference plane is the horizontal plane that contains said axis of projection.

12. A projector having a tilt angle measurement device according to claim 11, wherein:

said tilt angle measurement device further comprises a vertical tilt sensor for detecting the tilt angle of said axis of projection in the vertical plane that includes said axis of projection of said projector; and the output image of said display unit is controlled by combining the tilt angle in the vertical plane that is detected by this vertical tilt sensor with the tilt angle in the horizontal plane that is calculated from information of the heights and difference in heights of the photodetection positions of said reflected light in said right and left linear-arranged pickup elements.

13. A projector having a tilt angle measurement device according to claim 10, wherein the measured tilt angle is the tilt angle that is formed between said projection surface and said axis of projection in a vertical plane, and said reference plane is the vertical plane that contains said axis of projection.

14. A projector having a tilt angle measurement device according to claim 10, wherein said projection device is provided with a focus adjustment unit for adjusting the focal point of said projection lens, and said focus adjustment unit is controlled by the distance between said projection lens and said projection surface that is calculated in said photodetection position analyzing distance/tilt angle calculation unit.

15. A projector having a tilt angle measurement device according to claim 10, wherein said light guide unit is a pinhole that is provided in the wall of the case of said projector.

16. A projector having a tilt angle measurement device according to claim 10, wherein said light guide unit is an optical lens that is provided in the wall of the case of said projector.

17. A projector having a tilt angle measurement device according to claim 10, wherein the control of the output image of said display unit in accordance with the tilt angle that is formed between said projection surface and said axis of projection of said projection device is realized by preparing LSI control parameters from correction values of an input image of said display unit that are calculated in advance to correspond to said tilt angles, and which then controls the image processing LSI for the projector.

18. A projector having a tilt angle measurement device according to claim 10, wherein said projection device includes a liquid crystal display unit.

19. A projector having a tilt angle measurement device according to claim 10, wherein said projection device includes a DMD (Digital Micromirror Device) display unit, a color wheel, and a light source.

* * * * *